(12) United States Patent
Gourmel

(10) Patent No.: US 11,803,998 B2
(45) Date of Patent: *Oct. 31, 2023

(54) METHOD FOR COMPUTATION OF LOCAL DENSITIES FOR VIRTUAL FIBERS

(71) Applicant: Unity Technologies SF, San Francisco, CA (US)

(72) Inventor: Olivier Gourmel, Wellington (NZ)

(73) Assignee: Unity Technologies SF, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/716,610

(22) Filed: Apr. 8, 2022

(65) Prior Publication Data

US 2022/0230377 A1 Jul. 21, 2022

Related U.S. Application Data

(63) Continuation of application No. 17/098,221, filed on Nov. 13, 2020, now Pat. No. 11,315,299.

(51) Int. Cl.
| | |
|---|---|
| *G06T 15/06* | (2011.01) |
| *G06T 13/40* | (2011.01) |
| *G06T 17/20* | (2006.01) |
| *G06T 17/00* | (2006.01) |
| *G06T 15/08* | (2011.01) |
| *G06T 15/04* | (2011.01) |

(52) U.S. Cl.
CPC ............. *G06T 13/40* (2013.01); *G06T 15/04* (2013.01); *G06T 15/08* (2013.01); *G06T 17/005* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 5,608,856 A | 3/1997 | McInally | |
| 6,029,173 A | 2/2000 | Meek et al. | |
| 6,813,373 B1 * | 11/2004 | Suri | G06V 20/64 382/128 |

(Continued)

OTHER PUBLICATIONS

Moon, Jonathan T., and Stephen R. Marschner. "Simulating multiple scattering in hair using a photon mapping approach." ACM Transactions on Graphics (TOG) 25.3 (2006): 1067-1074. (Year: 2006).*

(Continued)

*Primary Examiner* — Sultana M Zalalee
(74) *Attorney, Agent, or Firm* — Haynes and Boone, LLP

(57) ABSTRACT

An image generator generates images of a set of virtual fibers and effects thereon by processing representations of the set of fibers and computing representation of a virtual surface for a fiber clump in the set of virtual fibers from an artist parameter representing a desired artist effect, computing correlations of the vertices from a set of vertices based on associations of the vertices corresponding to the artist parameter, computing a set of relevant vertices using the correlations of the vertices, computing orthogonal gradients to produce a plurality of gradients using a selected vertex and the set of relevant vertices for the fiber clump, and computing the virtual surface of the fiber clump from the plurality of gradients.

18 Claims, 7 Drawing Sheets

(56) References Cited

U.S. PATENT DOCUMENTS

| | | | |
|---|---|---|---|
| 7,542,036 | B2 | 6/2009 | Museth et al. |
| 7,884,826 | B1 | 2/2011 | Baraff |
| 9,177,421 | B2 | 11/2015 | Yuksel |
| 9,449,417 | B1 | 9/2016 | Iben et al. |
| 9,905,045 | B1 * | 2/2018 | Hery .................. G06T 15/06 |
| 10,163,243 | B2 | 12/2018 | Witkin et al. |
| 11,315,299 | B1 * | 4/2022 | Gourmel .............. G06T 13/40 |
| 2003/0016217 | A1 | 1/2003 | Vlachos et al. |
| 2003/0179203 | A1 | 9/2003 | Bruderlin et al. |
| 2003/0234781 | A1 * | 12/2003 | Laidlaw ............... G06T 15/08 345/419 |
| 2005/0212800 | A1 | 9/2005 | Petrovic et al. |
| 2007/0242067 | A1 | 10/2007 | Sharma et al. |
| 2008/0036782 | A1 | 2/2008 | Bruderlin et al. |
| 2009/0016598 | A1 | 1/2009 | Lojewski |
| 2011/0248997 | A1 | 10/2011 | Munkberg et al. |
| 2013/0321393 | A1 | 12/2013 | Winder |
| 2015/0269706 | A1 | 9/2015 | Popovic et al. |
| 2015/0326794 | A1 | 11/2015 | Uemura |
| 2018/0088538 | A1 | 3/2018 | Tian |
| 2019/0122427 | A1 | 4/2019 | Zeng et al. |
| 2019/0266781 | A1 | 8/2019 | Khadiyev et al. |

OTHER PUBLICATIONS

Mao, Xiaoyang, et al. "Automatic generation of hair texture with line integral convolution." 2000 IEEE Conference on Information Visualization. An International Conference on Computer Visualization and Graphics. IEEE, 2000. (Year: 2000).*

Woop Sven et al: "Exploiting Local Orientation Similarity for Efficient Ray Traversal of Hair and Fur", Eurographics/ACM SIGGRAPH Symposium on High Performance Graphics, Jun. 2014 (Jun. 2014), pp. 41-49, XP055788269, DOI: 10.2312/hpg.20141092 Retrieved from the Internet: URL:http://diglib.eg.org/handle/10.2312/hpg.20141092.041-049 [retrieved on Mar. 22, 2021] sections 2, 3.

Leonhard Grunschloss et al: "MSBVH: an efficient acceleration data structure for ray traced motion blur", High Performance Graphics, ACM, 2 Penn Plaza, Suite 701 New York NY 10121-0701 USA, Aug. 5, 2011 (Aug. 5, 2011), pp. 65-70, XP058006582, DOI: 10.1145/2018323.2018334 ISBN: 978-1-4503-0896-0 section 3.

Kelly Ward et al: "A Survey on Hair Modeling: Styling, Simulation, and Rendering", IEEE Transactions on Visualization and Computer Graphics, IEEE Service Center, Los Alamitos, CA, US, vol. 12, No. 2, Mar. 2007 (Mar. 2007), pp. 213-234, XP011157907, ISSN: 1077-2626 the whole document.

* cited by examiner

METHOD FOR COMPUTATION OF LOCAL DENSITIES FOR VIRTUAL FIBERS

CROSS REFERENCE TO RELATED APPLICATIONS

This application is a continuation of U.S. Non-Provisional patent application Ser. No. 17/098,221, filed Nov. 13, 2020, which is incorporated herein by reference in its entirety.

FIELD

The present disclosure generally relates to computer-generated imagery and more particularly to computations of virtual surfaces of fiber collections for use in generating imagery representing the fiber collections.

BACKGROUND

As digital animation in movies and games has increased in popularity, so has the complexity of the models and the virtual environments in which they interact. Viewers demand continuously increasing visual richness of virtual environments in computer animated scenes, which has led game and movie creators to turn to physical simulation create realistic interactions between objects, such as by using a physics engine to output movements of objects that are consistent with real-world physics. In some ways, this is often a simple problem—how to determine natural-looking movements of a few rigid objects. For other simulations, such as those with many flexible objects, such as hair, fur, or other fibers, the number of degrees of freedom of individual objects or portions of objects is much greater, and typically computer simulation requires a trade-off between realism, resolution, and amount of computing resources available. Because of this trade-off, efficient computer simulation techniques can be important as they might allow for an increase in realism and/or resolution without requiring significant increases in computing resources.

For example, a higher spatial resolution is required to smoothly capture ultra-high-resolution interactions of hair than is typically used if hair were modeled as one large "wig" or "groom" which did not move as it interacted with the environment. When a visual effects ("VFX") shot requires hair to move realistically and/or according to a characteristic or effect, the computing resources required to generate the hair can exceed those available or cause computer performance issues during rendering, such as by overly consuming and taxing available computing resources and requiring significant time during rendering. Some algorithms cannot scale to a high-enough number of fibers to allow for realistic simulation of individual fibers required in hair or a furry animal due to the heavy geometry of the models involved. A human groom can contain up to 10,000 strands of hair, with each strand potentially containing hundreds of vertices. Thus, computer rendering resources, operations, and systems may not be capable of performing such rendering of hair and other fibers as required by groom animations and/or effects.

SUMMARY

A computer-implemented method in a computer graphics generation system may compute a representation of a virtual surface for a fiber clump in a set of virtual fibers, wherein virtual fibers in the set of virtual fibers are represented by fiber curves or splines, such as a piecewise curve represented in a computer animation system as a combination of multiple polynomials. The computer graphics generation system may receive a set of vertices along the curve or spine, wherein vertices of the set of vertices are associated with virtual fibers of the set of virtual fibers. A first virtual fiber may be represented in the set of vertices as a first plurality of virtual fiber vertices defining a first fiber curve and including a first vertex, and a second virtual fiber may be represented in the set of vertices as a second plurality of virtual fiber vertices defining a second curve and including a second vertex. The computer graphics generation system may obtain an artist parameter representing a desired artist effect and compute a bounding volume hierarchy from the set of vertices based on associations of vertices in the set of vertices with fiber curves and based on the artist parameter. The computer graphics generation system may compute a set of relevant vertices of the set of vertices, using the bounding volume hierarchy. The computer graphics representation system may compute a pair of orthogonal gradients to produce a plurality of gradients, computed from a selected vertex and the set of relevant vertices. The computer graphics representation system may compute the virtual surface of a clump of the set of virtual fibers from the plurality of gradients.

Computing the set of relevant vertices may comprise pruning the bounding volume hierarchy and limiting the set of relevant vertices to vertices within a specified distance from the selected vertex. The specified distance may be specified by the artist parameter or based on the groom and/or scene in which the groom is placed and rendered. The computer graphics generation system may receive a table of precomputed values, computed from an inverse of (2k+1), an inverse of a square of the artist parameter, and a binomial coefficient of n and k, for some integers k and n with $0 \leq k \leq n$. The virtual surface may be based on a normal to a gradient field comprising the plurality of gradients. Computing the pair of orthogonal gradients may comprise computing a finite-support kernel. Computing the pair of orthogonal gradients may comprise using a local frame that is aligned and perpendicular to a direction of a line from the first vertex to the second vertex with the first vertex and the second vertex being members of the set of relevant vertices.

A computer-implemented method for generating an animated image may comprise the method and rendering an animated image using the representation of a virtual surface for a fiber clump in a set of virtual fibers. Thus, a computer system may comprise one or more processors and a storage medium storing instructions, which when executed by the at least one processor, cause the system to implement this method rendering an animated image using the representation. This computer-implemented method therefore allows for faster and more coordinated rendering of computer animated images and videos, while requiring less intensive computational resources. Therefore this representation of the virtual surface reduces computing time and resource cost while maintaining realistic computer animations for certain surfaces having fibers including grooms of hair or other fibers on characters.

BRIEF DESCRIPTION OF THE DRAWINGS

Various embodiments in accordance with the present disclosure will be described with reference to the drawings, in which.

DETAILED DESCRIPTION

Figure 1:
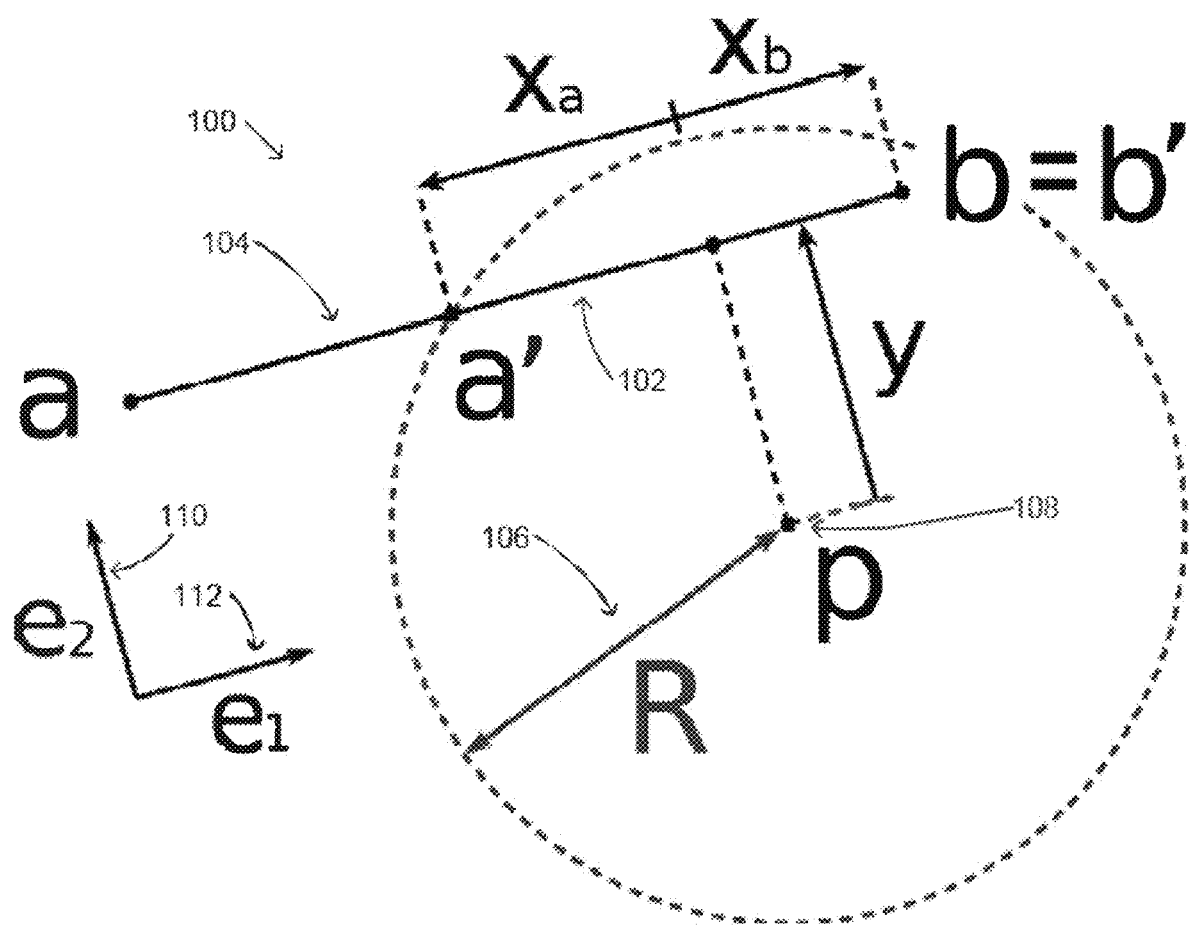
FIG. 1 is a diagram of a frame of reference illustrating a computation of a gradient in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In certain effects and animations, individual fibers may be bundled or clumped, having a particular surface used to represent those individual fibers collectively. An example used herein may be hair, where multiple hair elements have common characteristics, such as being fibers within a groom, having similar cross-sectional thicknesses, etc. It should be understood that examples of techniques that use hair strands herein are not so limited and could be used for simulation of other sets of fibers, such as fur, feathers, braids, rope, scales, and the like. A groom may be a set of fibers that are intended to represent hair, fur, pelt, or other surface feature of a character (or possibly a noncharacter object) that might be simulated.

A specular reflection of light on a surface outlining the silhouette of the clumps within a groom may give a characteristic appearance and/or effect. To capture this effect in rendering systems, it is helpful to estimate the surface of the clumps in a smooth manner over each individual clump. For example, when animating and rendering grooms or hair, an explicit reconstruction of the surface itself may not be required in the computer animation system as a characteristic or effect may be thin and/or close to individual fibers. Estimating the normal vector of the clump surface may be sufficient, as it defines the direction followed by a ray of light as it is reflected against a particular surface. This normal vector field may be very smooth in order to produce realistic reflections over the clumps of fibers in the groom. This reduces the computational intensity of the operations to show a specular reflection of light in the computer animation, thereby saving computational resources and time in animating and rendering a three-dimensional (3D) groom on a character, creature, or object.

This method need not be limited to hairs and corresponding grooms (e.g., hairstyles, furs, or pelts having clumps of fibers), but could apply to any large set of like elements that are modeled by fibers. While examples herein might refer to hair, it should be understood that unless otherwise indicated, the examples can apply to fur, fur-like elements, hair-like elements, and similar sets of like elements such as strands, wires, etc. Thus, in general, there may be a collection of a large number of objects, each of which may be represented by a polyline composed of multiple segments, which may also be represented as a curve or spline in the computer animation system. Each polyline can be represented in memory by an ordered list of vertices along the polyline and/or corresponding curve/spline. A segment may be a portion of a polyline between two vertices.

The surface of a clump may be at the border between two volumes: the inside of the clump filled with the fibers and the outside not containing any fiber. Whether a point is inside or outside a clump may be determined by computing the local hair density at this point. The gradient of such a local hair density function may be used to approximate the clump surface normal. There may be multiple ways to define the local hair density. For the estimation of the clump surface normal, the actual density value need not be accurate, though, to provide continuous reflections, the gradient of the resulting density field should be smooth over the clump in order to give the representation and visualization of specular lighting reflections in the computer animation system.

For use in animation, the density field should be stable across frames, and the density value should evaluate quickly. In one embodiment, there may be millions of evaluations per frame. Below is described a method for determining surface normals (e.g., normal vectors) at points on a large number of like elements for use in rendering effects. This provides for efficient simulation of large numbers of like elements, such as hairs within the computer animation system without computationally intensive animating and rendering operations with characteristics and effects directly on the groom of fibers. Thus, using these methods and processes described herein, the computer animation and rendering system may reduce time and resource cost in animating and rendering a groom of fibers having certain effects over those grooms of fibers.

In an embodiment, a set of fibers may be a set of strands $S = \{s_1, s_2, s_3, \ldots\}$, such as the set of fibers that may be represented in a clump of a groom. Each strand may be modeled as a polyline defined by a set of points such that $s_1 = \{p_1^i, p_2^i, \ldots, p_n^i\}$. A smooth hair density function may be determined by convolution surfaces over the clumps. The density value may be obtained by convolving a smooth function kernel along the line segments of the strands or fibers. The convolved density fields are smooth and stable and may be evaluated efficiently if an appropriate finite-support kernel is used. The resulting field function may not depend on the sampling of the strands or fibers, which is helpful when strands or fibers are not uniformly shaped.

One piecewise polynomial kernel $\phi$ that may be used is:

$$\phi(x) = \begin{cases} \left(1 - \frac{x^2}{R^2}\right)^n & |x| \leq R \\ 0 & |x| > R \end{cases}$$

where $\phi$ is a smooth finite-support approximation of a Gaussian function. Parameter R controls the smoothing radius of the density field, and thus the scale of the clumps whose surface normal is reconstructed. The integer n controls the quality of the approximation: the higher it is, the better the $\phi$ approximates a Gaussian function. In one embodiment, n=4 may provide a good balance between smoothness and evaluation time, though other values may be utilized depending on the groom, scene, and/or fibers, as well as the computer animation and rendering system (e.g., the time). In some embodiments, the integer is a user-specified value.

The density, D, at a point x is thus given by the convolution of ϕ over all the strands, which can be evaluated using the separation of convolution integrals shown in Equations 1 and 2, where F(a, b, p) represents the convolution of ϕ over .segment [ab] evaluated at point p.

$$D(x) = \sum_{k_i \in S} \sum_{j=1}^{|s_i|-1} F(p_j^i, p_{j+1}^i, x) \qquad \text{(Eqn. 1)}$$

$$F(a, b, p) = \|\vec{ab}\| \int_0^1 \phi(\|a + \vec{ab}t - p\|) dt \qquad \text{(Eqn. 2)}$$

The gradient of the density which approximates the normal of the clumps surface is thus given by:

$$\nabla D(x) = \sum_{k_i \in S} \sum_{j=1}^{|s_i|-1} \nabla F(p_j^i, p_{j+1}^i, x)$$

FIG. 1 shows the definition of the local frame $\mathcal{B}$ 100 used in the evaluation of the convolution integral. With reference to FIG. 1, element 100, [a'b'] 102 is subsegment of [ab] 104 that intersects the sphere of radius R 106 centered at p 108, which corresponds to points where ϕ≠0 in Equation 2 so that F(a, b, p)=F(a', b', p).

Substituting the expression of ϕ in Equation 2 gives a polynomial of degree 2n. It is possible to develop the polynomial, then evaluate the integral, resulting in an expression in powers of a', b' and p. This may be computationally intensive for use with computer animation and rendering. The expression of its gradient ∇F which is obtained by derivating F along each component of p is more complicated and difficult to evaluate efficiently.

Instead, the expression of F and ∇F may be simplified using an appropriate frame in order to reduce computational time and resources used in performing the computations in a computer animation and rendering system. Considering frame $\mathcal{B}$ 100 of FIG. 1 at point p defined by vectors (e₁, e₂) (110, 112, respectively) in FIG. 1 and as represented by:

$$e_1 = \frac{\vec{ab}}{\|\vec{ab}\|}$$

$$e_2 = \frac{\vec{pd} - (\vec{pd} \cdot e_1)e_1}{\|\vec{pd} - (\vec{pd} \cdot e_1)e_1\|}$$

Denote ($x_a$, y) and ($x_b$, y) as the respective coordinates of points a' and b' in this frame $\mathcal{B}$. These points have the same coordinate along $e_2$. The expression for F (the convolution of ϕ over a segment, such as [a'b'] 102) becomes:

$$F(a, b, p) = \qquad \text{(Eqn. 3)}$$

$$\int_{x_a}^{x_b} \left(1 - \frac{x^2 + y^2}{R^2}\right)^n dx = \left(-\frac{1}{R^2}\right)^n \int_{x_a}^{x_b} (x^2 + y^2 - R^2)^n dx =$$

$$\left(-\frac{1}{R^2}\right)^n \sum_{k=0}^{n} \binom{n}{k} (y^2 - R^2)^{n-k} \int_{x_a}^{x_b} x^{2k} dx =$$

-continued $$\sum_{k=0}^{n} u_k (x_b^{2k+1} - x_a^{2k+1})(y^2 - R^2)^{n-k}$$

where:

$$u_k = \frac{1}{2k+1}\left(-\frac{1}{R^2}\right)^n \binom{n}{k}$$

Considering Equation 3, there are only n+1 elements to be summed, even though the original polynomial in the expression of ϕ has degree 2n. The $u_k$ values may be precomputed in a table stored in memory, making the evaluation of the convolved kernel ϕ simple and efficient by a computer animation and rendering system. Thus, when evaluating for the convolution over a segment in order to find density and gradient of the density, less computations are required by the corresponding computing system and animating/rendering of a groom of fibers may be performed in real-time and/or quickly with less required computational resources.

The gradient ∇F also has an interesting expression in frame $\mathcal{B}$. First, translating p along $e_1$ is equivalent to translating both a and b along $-e_1$ as illustrated in Equation 4.

$$\nabla F \cdot e_1 = -\left(\frac{\partial F}{\partial x_b} + \frac{\partial F}{\partial x_a}\right) = \sum_{k=0}^{n} u_k (2k+1) x_a^{2k} (y^2 - R^2)^{n-k} - \qquad \text{(Eqn. 4)}$$

$$\sum_{k=0}^{n} u_k (2k+1) x_b^{2k} (y^2 - R^2)^{n-k} =$$

$$\left(-\frac{1}{R^2}\right)^n \left(\sum_{k=0}^{n} \binom{n}{k} x_a^{2k} (y^2 - R^2)^{n-k} - \sum_{k=0}^{n} \binom{n}{k} x_b^{2k} (y^2 - R^2)^{n-k}\right) =$$

$$u_0 ((x_a^2 + y^2 - R^2)^n - (x_b^2 + y^2 - R^2)^n)$$

For similar reasons Equation 5 is also satisfied.

$$\nabla F \cdot e_2 = -\frac{\partial F}{\partial y} = -2y \sum_{k=0}^{n-1} (n-k) u_k (x_b^{2k+1} - x_a^{2k+1})(y^2 - R^2)^{n-k-1} \qquad \text{(Eqn. 5)}$$

Figure 2:
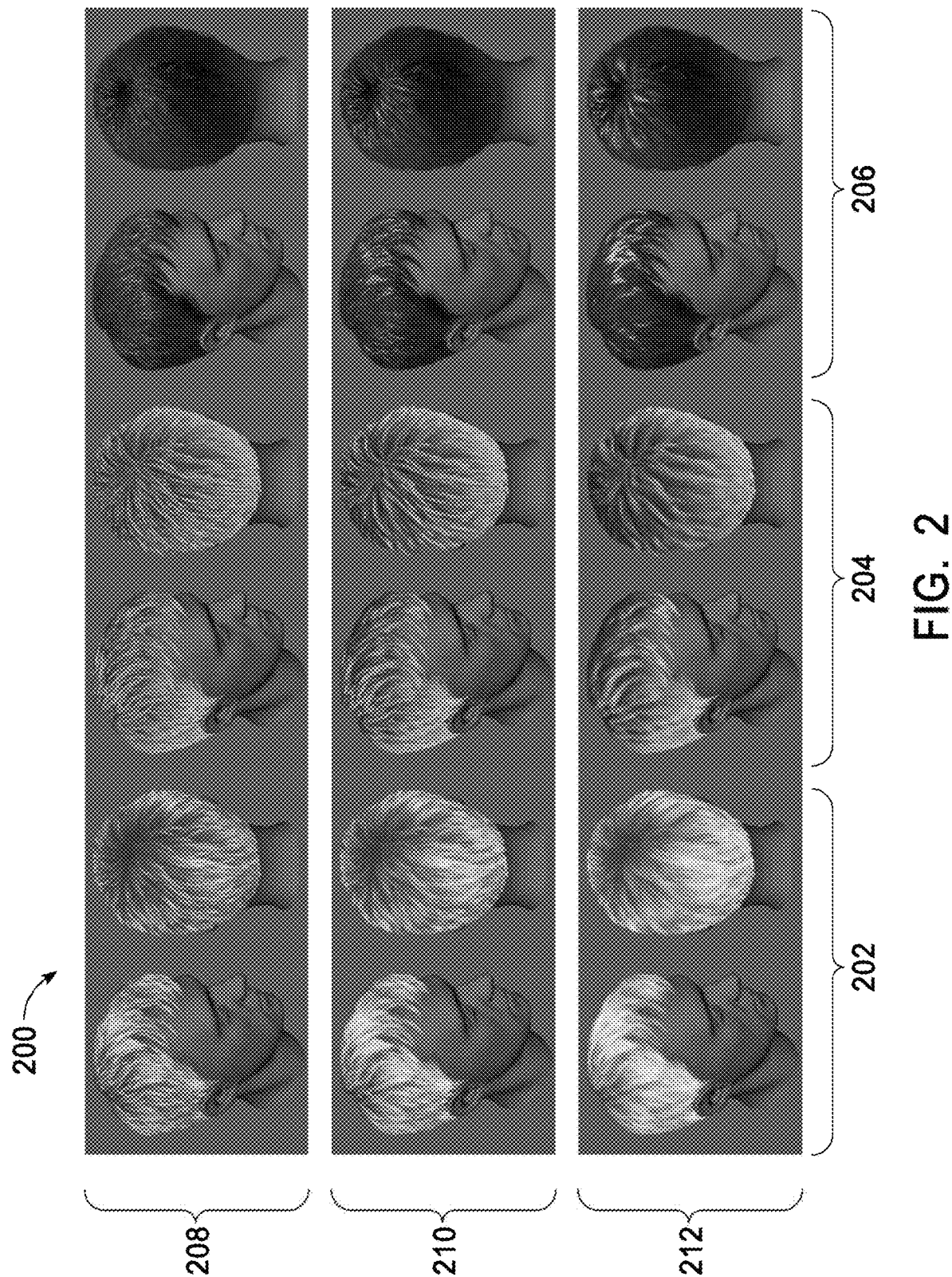
FIG. 2 illustrates output from computing gradient densities in accordance with an embodiment.

The equalities of Equations 4 and 5 would still hold even if a' or b' lie on the sphere of radius R centered at p. This is due to ϕ having vanishing derivatives at R as explained herein. Hence this does not require any special handling, making branch-free implementations possible. In particular, this benefits parallel implementations of the single instruction, multiple data (SIMD) type where a computer animation and rendering system may utilize multiple different processing elements on different data points simultaneously (e.g., clumps and corresponding densities and density gradients). This allows he density and its gradient to be computed simultaneously at different evaluation points. ∇F·($e_1 \times e_2$)=0 due to the symmetry of the problem. Thus, real-time or near real-time animating and rendering of grooms of fibers with certain characteristics or effects may be accomplished faster and with less resources by the computing systems FIG. 2, item 200, shows the resulting density and gradient fields on a sample groom obtained with different R values. The six grooms on the left 202 show the normalized density values. The middle six grooms 204 show the normalized gradient of the density, which approximates the surface normal of the clumps. The six groom on the right 206 show the specular lighting computed using the approximated normal for example, during shading or other rendering operations. The values of the kernel radius R are: 0.25 cm (top row, 208), 0.5 cm (middle row, 210) and 1 cm (bottom row, 212). Increasing R makes the algorithm reconstruct larger clumps of hair, and the corresponding specular reflection may be adjusted. Thus, R may be used to control the overall specular reflections in order to adjust the overall characteristics or effects of the hair between different amounts of specular reflections. The kernel radius might be an artist parameter that might be determined from an artist input corresponding to a desired result the artist is seeking.

For the purpose of shading the hair with certain reflections, it may be necessary to evaluate the density gradient at the vertices of each fiber or hair strand. The evaluation can be made more efficient by using the fact that ϕ has finite support, thus only a few of the strand segments are actually involved in the computation of the density at any point reducing computational intensive processes required by the computer animation and rendering system. For exploiting the locality of the segments, one approach may be to build a partitioning tree structure such as a Bounding Volume Hierarchy (BVH) over the set of fiber segments. This may also include use of K-Dimensional trees, or K-D trees, that may be utilized for searching and correlation of vertices for fibers. Then when evaluating the density at a point p, this BVH can be traversed to quickly prune groups of segments whose distance from p is larger than R.

Figure 3:
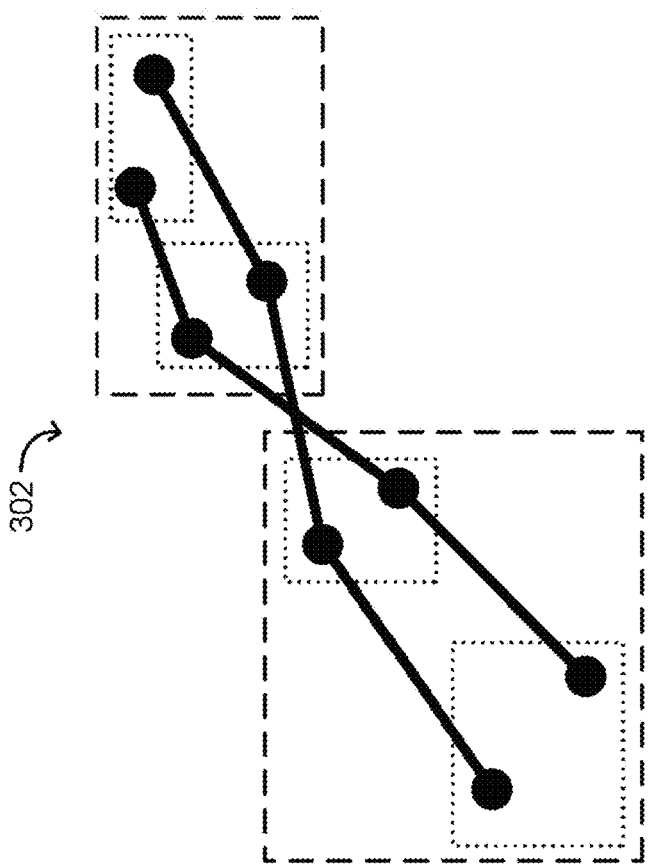
FIG. 3 shows two approaches to computing a bounding volume hierarchy in accordance with an embodiment.
Figure 3:
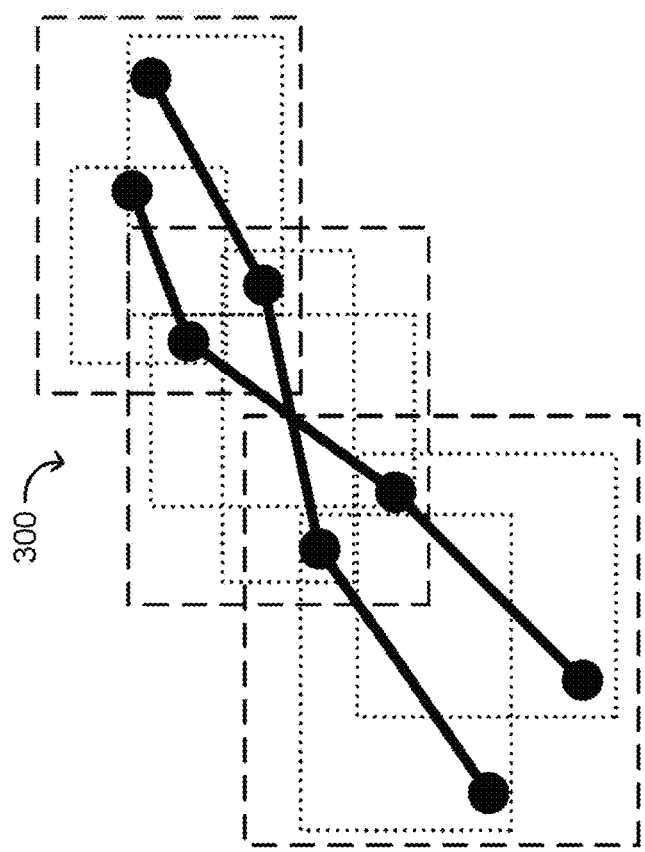

FIG. 3 illustrates different BVHs over fiber strands made up of individual segments having vertices, which may correspond to evaluation points for the strand structures. A BVH 300 is shown having bounding boxes corresponding to strand segments, while a BVH 302 is shown having bounding boxes corresponding to the evaluation points (e.g., the vertices along the strand). Partitioning the strands as described above can improve performance of the computer animation and rendering system, reducing processing cost and time in performing such calculations and operations with grooms of fibers. Further performance improvement of computing systems can be realized by building the partitioning tree structure over the evaluation points as shown in BVH 302 instead. Then for each strand segment s, this structure can be traversed in order to quickly prune groups of points whose distance from s is larger than R. This improves performance because there are roughly as many evaluation points (strand vertices) as there are strand segments. The spatial extent of a point is zero, while segments have a non-zero extent. Hence a partitioning structure built over the evaluation points will be more efficient at splitting the data into disjoint sets than a partitioning structure built over the strand segments (that is, it will cull the empty space better). It is usually much faster to traverse a partitioning structure with non-overlapping nodes.

In FIG. 3, a BVH 300 built over the strand segments and BVH 302 built over the evaluation points. The dashed rectangles represent the bounding boxes of the BVH nodes, each color corresponding to a different level in the structure. This illustrates the difference between the two approaches. One can see that the sparsity of the partitioning structure is improved if it is built over the evaluation points. This makes its traversal faster during animation and rendering by reducing the required data and overlapping partitioning structures, thereby improving performance of the computing systems. In BVH 300, bounding boxes are identified by segments, which creates more and larger bounding boxes having Thus, in BVH 302 of FIG. 3, a sparser positioning structure may be determined by looking individually over the strand at evaluation points, or vertices of the strand for individual segments that make up the strand. By utilizing the vertices or the evaluation points, number and space of the bounding boxes may be reduced. Thus, the computer animation and rendering system may instead sort evaluation points along the strand or corresponding space fitting curve in order to determine whether points intersect and/or are nearby when creating the bounding box information and BVH.

Figure 4:
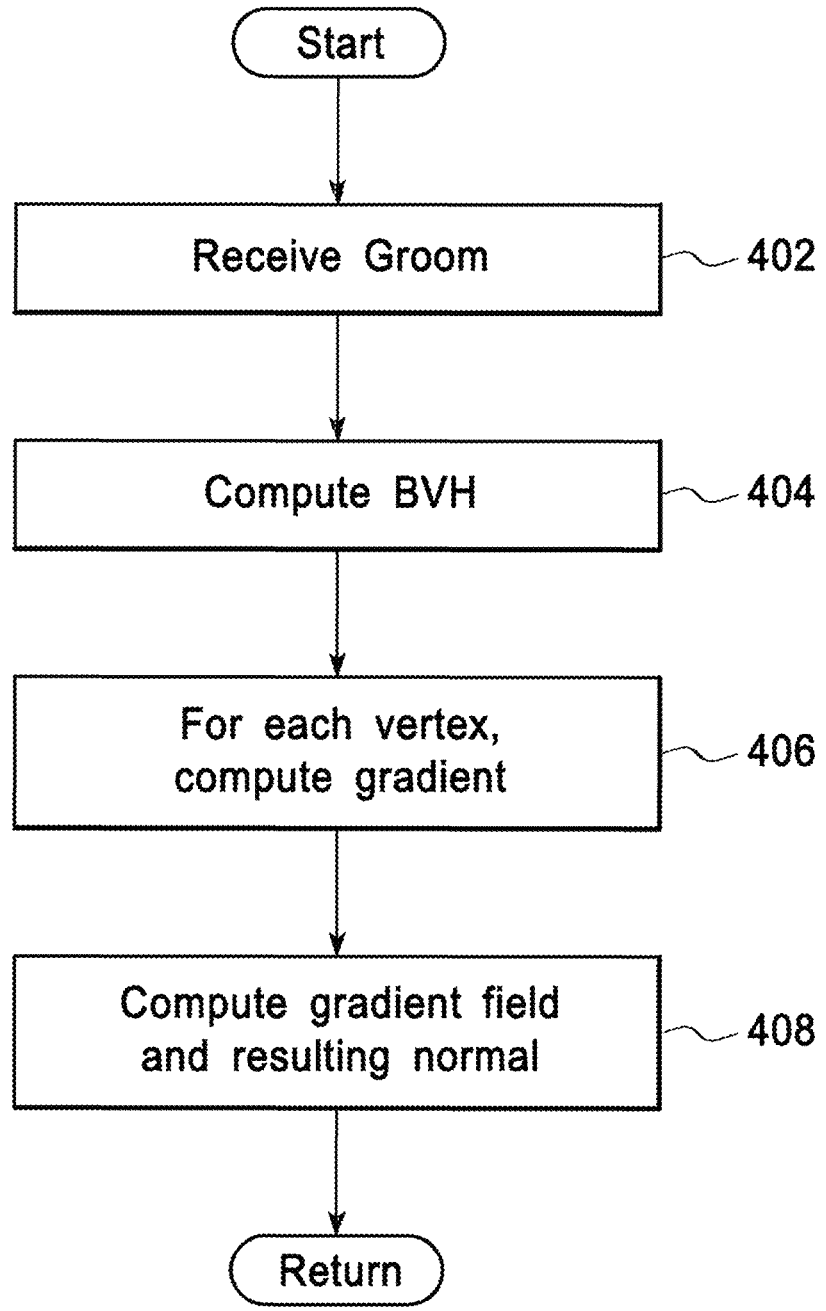
FIG. 4 shows a method of computing gradient densities for groom fibers to provide fiber clump surfaces in accordance with an embodiment.

FIG. 4 shows a method in accordance with an embodiment. One or more steps, processes, and methods described herein of FIG. 1 may be omitted, performed in a different sequence, or combined as desired or appropriate. In step 402, the computer system receives a groom. The groom may correspond to hair or a hairstyle of a character that includes many different fibers or individual strands of hair. In this regard, modeling the groom is computationally intensive as the groom may be made of $10^5$ or higher individual fibers. When a groom is intended to be animated with a specific characteristic or effect based on specular lighting reflections, animation of the characteristic or effect over the groom to represent specular reflections of light is very computationally intensive and heavy, requiring significant computer resources and time. Thus, to avoid such issues in animation and rendering systems, FIG. 4 includes steps of a corresponding method that represents clumps of fibers as a smooth surface using surface normal to compute a smoothing function that allows for representation of a groom for specular light reflections.

In step 404, the system computes the bounding volume hierarchy. This may be done using the individual evaluation points or vertices along each individual strand and correlating those with a nearby other evaluation point or vertices. In further embodiments, other processes may be used to determine and/or calculate correlations of the vertices for individual strands with nearby evaluation points or vertices. For example, a linear searching approach may be used, but approximate solutions may also increase the speed and efficiency of the searching for nearby vertices and correlations of the vertices. Thus, any search and/or searching mechanism to find nearby points of vertices and correlate those vertices may be used. However, an acceleration structure used to more quickly correlate vertices with nearby vertices, such as the aforementioned bounding volume hierarchy, may be used. This allows for faster computation of the correlations between vertices, which increases computing speed and reduces computing resources and processing requirements.

Thereafter, bounding box information may be determined using the evaluation points instead of the strand segments, reducing the area of bounding boxes and overall number in the BVH. Various input parameters may also be received by an artist or other user of the computer animation and rendering system in order to define the overall look of the groom having the smooth surface from surface normal. An input parameter, R, can represent a smoothing radius that might be set by an artist after viewing rendering results. In implementations as described herein, larger values of R result in larger clumps of hair resulting in more specular reflection and in turn resulting in a particular characteristic or effect with the corresponding hair or groom. Another input parameter, n, is used to indicate a desired quality factor. A higher value results in the density function more closely approximating a Gaussian function, whereas a lower value reduces the computational effort. An example value might be n=4. When determining which vertices to process, a partitioning tree structure (e.g., the BVH) and the like might be used over the set of strand segments.

In step 406, the system computes a pair of orthogonal gradients at each vertex of each fiber. When determining the density gradient at a given vertex, because of the finite-support kernel, segments that are further than R from that vertex can generally be ignored. Thus, a density gradient might be determined using a finite-support kernel. A function for density gradient might be selected to provide for smoothness (large variations in surface normals do not occur over small distances), time stability (no large changes over small time periods), and computational efficiency. One such density function uses a convolution surface.

At step 408, the computed gradients are combined to produce a gradient field, from which a normal to a surface may be computed. The output may be provided to a renderer to determine ray reflection based on the surface normals. This may be done in order to represent a groom having a characteristic or effect within an animation and rendering system, such as one or more frames of a computer animated character and/or scene. By using the surface normal to define the smooth surface of individual clumps of fibers within the groom, the computing system requires less resources and time to realistically animate and render the shading and look of the characteristic or effect for hair, fur, or other fibers on or associated with a character.

Thus, in accordance with one embodiment of the invention, a groom may be received that may correspond to a dataset that represents a large number of fibers (e.g., the strands of the groom, which could each be hairs). Each fiber object may be represented by a polyline, which in turn can be represented in memory as a list of strand vertices each characterized by a position in a scene space, such as a 3D geometric space. Given the groom, a computer system may efficiently determine and output a set of surface normals or normal vectors (or produce individual surface normals upon request). Each surface normal is a normal vector for a presumed surface of a clump of fibers, and a clump is a subset of fibers that are densely packed relative to a surrounding set of fibers.

Below is an explanation of the validity of the expression of the gradient. Let us assume that a' lands on the sphere of radius R centered at p:

$$x_a = x_a(y) = -\sqrt{R^2 - y^2}$$

Thus:

$$\frac{\partial F}{\partial y} = \sum_{k=0}^{n} u_k \left( -(2k+1)x'_a(y)x_a(y)^{2k} \right)\left(y^2 - R^2\right)^{n-k} +$$

$$2y\sum_{k=0}^{n-1}(n-k)u_k\left(x_b^{2k+1} - x_a^{2k+1}\right)\left(y^2 - R^2\right)^{n-k-1} =$$

$$-x'_a(y)\left(-\frac{1}{R^2}\right)^n \sum_{k=0}^{n}\binom{n}{k}\left(R^2 - y^2\right)^k\left(y^2 - R^2\right)^{n-k} +$$

$$2y\sum_{k=0}^{n-1}(n-k)u_k\left(x_b^{2k+1} - x_a^{2k+1}\right)\left(y^2 - R^2\right)^{n-k-1} =$$

$$-x'_a(y)\left(-\frac{1}{R^2}\right)^n \left(R^2 - y^2 + y^2 - R^2\right)^n +$$

$$2y\sum_{k=0}^{n-1}(n-k)u_k\left(x_b^{2k+1} - x_a^{2k+1}\right)\left(y^2 - R^2\right)^{n-k-1} =$$

$$0 + 2y\sum_{k=0}^{n-1}(n-k)u_k\left(x_b^{2k+1} - x_a^{2k+1}\right)\left(y^2 - R^2\right)^{n-k-1}$$

Moreover:

$$\frac{\partial F}{\partial x_a} = -\sum_{k=0}^{n}u_k(2k+1)x_a^{2k}\left(y^2 - R^2\right)^{n-k}$$

Hence equalities (4) and (5) still hold in when a' and b' are on the boundary of the support of ϕ.

Figure 5:
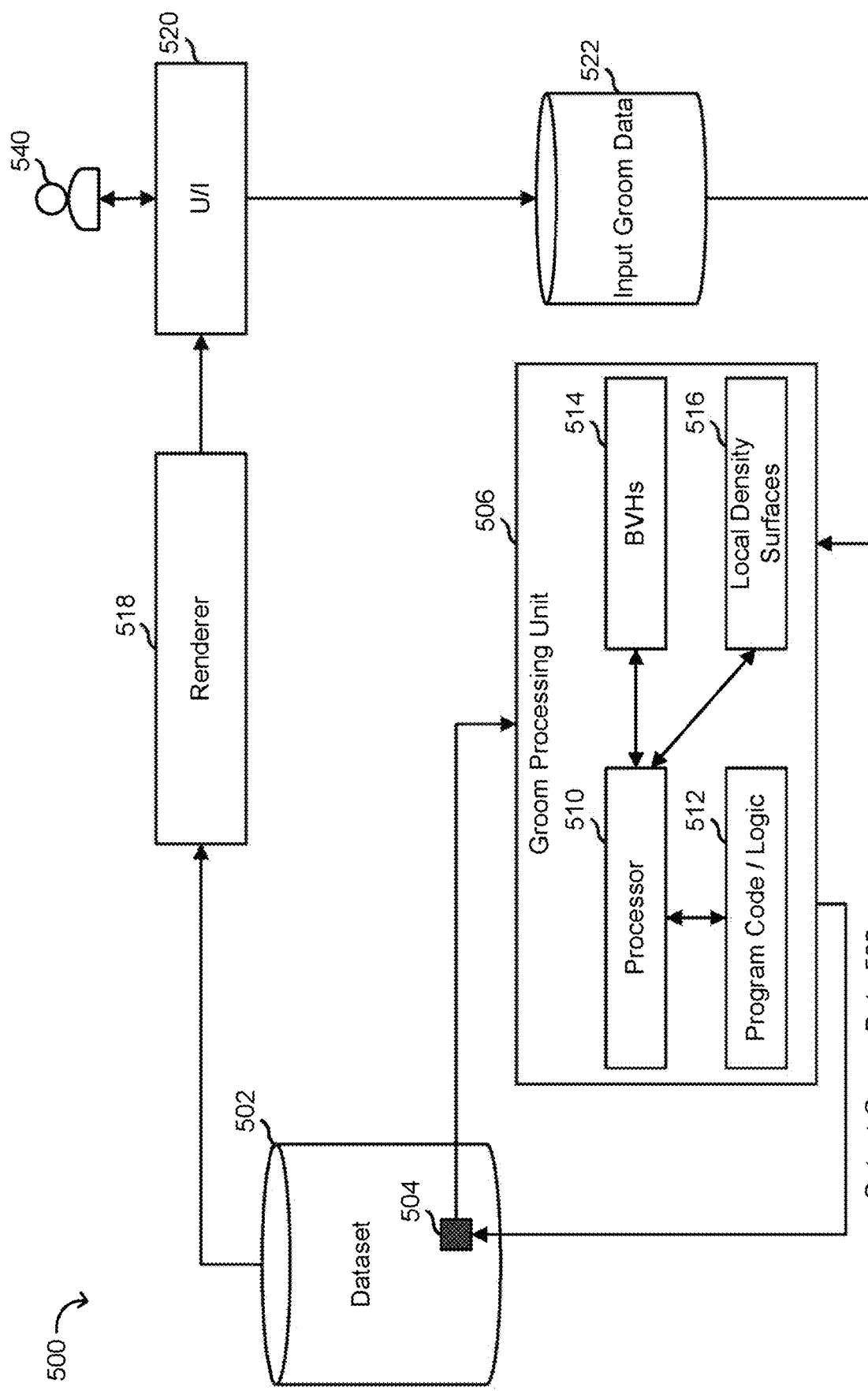
FIG. 5 illustrates a system for utilizing local densities of groom fibers to provide surfaces for groom rendering and shading techniques within a computer animation in accordance with an embodiment.

FIG. 5 illustrates a system 500 for calculating gradient densities of clumps of fibers in a groom within a computer animation, in an embodiment. System 500 includes a dataset 502, a groom processing unit 506, a renderer 518, a user interface (UI) 520, and an input groom data 522.

A user 540 may interact with the UI 520 to access, load, and/or define one or more grooms of individual fibers, such as an object having fibers defined by curves, objects, splines, or the within the groom. The groom may therefore be pre-generated or may be generated by user 540 when performing processes to generate smooth surfaces for clumps of fibers based on their surface normal vectors as described herein. Input groom data 522 may indicate, for example, the criteria for the groom and determining a surface from density gradients. Input groom data 522 may include, for example, a factor or parameter for a smoothing radius to be identified in a selected groom, although automated techniques may also be used depending on groom size, resolution, scene placement, animation/effect factor or parameter, and the like. Dataset 502 may store data for different fibers and grooms that may be stored and/or loaded, such as characters, creatures, or objects. Dataset 502 may be loaded with data from a source of an animation, such as a tessellated mesh, subdivision surface, or the like used to define a groom or other object of fibers (e.g., a pelt, coat, robe, cloak, etc.).

Groom processing unit 506 may utilize the methods and processes described herein to take input groom data 522 with any additional groom data from dataset 502, and perform the operations for determining surface normals, thereby more easily animating a groom to have specular lighting effects. The groom processing unit 506 may clump fibers by their surface normals, which may be used then to create normal vectors used to determine a smooth surface from clumps in the groom as described herein. Further, a surface radius to determine an effect factor or parameter may be provided as input, such as an artist-defined factor or parameter, as described herein.

Groom processing unit 506 includes a processor 510 that executes program code 512 to cluster fibers in BVHs 514 to local density surfaces 516. Groom processing unit 506 may further groom output data 508 to dataset 502 so that the corresponding local density surfaces 516 from BVHs 516 may be stored for later use, such as with renderer 518 when rendering a scene having the groom that may have specular lighting effects during animation and rendering. For example, groom processing unit 506 may initiate the process by taking input groom data 522 with any additional data from dataset 502, and thereafter determining local density surfaces 516 through surface normals. Based on local density surfaces 516, groom processing unit 506 may then provide any groom and clumping data as groom output data 508 for storage by dataset 502. This allows for reproduction of the corresponding groom, clumps, and/or animation parameters based on local density surfaces 516. Groom processing unit 506 may then move to the next groom designated by user 540 and further perform additional determination of density gradients and surfaces as requested. The resulting grooms, clusters, fibers, and the like that have been animated and stored by dataset 502 may further be rendered by rendered 518 and/or output to user 540 to inspect the results.

Figure 6:
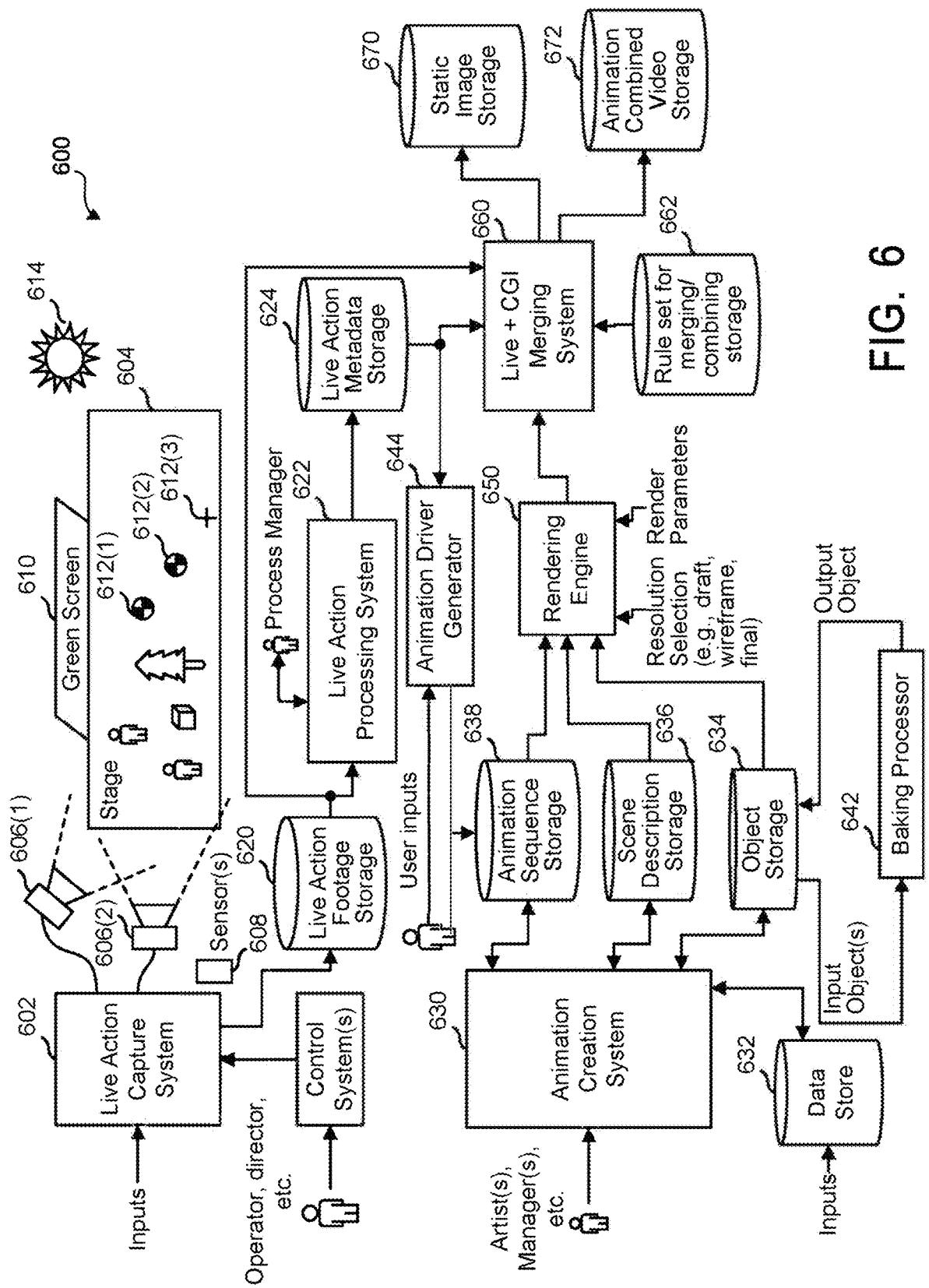
FIG. 6 is a block diagram illustrating an example computer system upon which computer systems of the system illustrated in FIG. 6 or computer method of FIG. 4 may be implemented in accordance with an embodiment.

For example, FIG. 6 illustrates the example visual content generation system 600 as might be used to generate imagery in the form of still images and/or video sequences of images. Visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. Live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On stage 604, there might be human actors, animal actors, inanimate objects, background objects, and possibly an object such as a green screen 610 that is designed to be captured in a live scene recording in such a way that it is easily overlaid with computer-generated imagery. Stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, live action capture system 602 might output live action footage to a live action footage storage 620. A live action processing system 622 might process live action footage to generate data about that live action footage and store that data into a live action metadata storage 624. Live action processing system 622 might include computer processing capabilities, image processing capabilities, one or more processors, program code storage for storing program instructions executable by the one or more processors, as well as user input devices and user output devices, not all of which are shown. Live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 614, as that might be useful in post-processing to match computer-generated lighting on objects that are computer-generated and overlaid on the live action footage. Live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of visual content generation system 600. Animation creation system 630 might include computer processing capabilities, image processing capabilities, one or more processors, program code storage for storing program instructions executable by the one or more processors, as well as user input devices and user output devices, not all of which are shown. Animation creation system 630 might be used by animation artists, managers, and others to specify details, perhaps programmatically and/or interactively, of imagery to be generated. From user input and data from a database or other data source, indicated as a data store 632, animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 630 might be interactive, allowing a user to read in animation sequences, scene descriptions, object details, etc. and edit those, possibly returning them to storage to update or replace existing data. As an example, an operator might read in objects from object storage into a baking processor 642 that would transform those objects into simpler forms and return those to object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 632 might be used to drive object presentation. For example, if an artist is creating an animation of a spaceship passing over the surface of the Earth, instead of manually drawing or specifying a coastline, the artist might specify that animation creation system 630 is to read data from data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. Animation driver generator 644 might generate corresponding animation parameters to be stored in animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 622. Animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 650 might include computer processing capabilities, image processing capabilities, one or more processors, program code storage for storing program instructions executable by the one or more processors, as well as user input devices and user output devices, not all of which are shown.

Visual content generation system 600 can also include a merging system 660 that merges live footage with animated content. The live footage might be obtained and input by reading from live action footage storage 620 to obtain live action footage, by reading from live action metadata storage 624 to obtain details such as presumed segmentation in captured images segmenting objects in a live action scene from their background (perhaps aided by the fact that green screen 610 was part of the live action scene), and by obtaining CGI imagery from rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from rendering engine 650, and output an image where each pixel is a corresponding pixel from rendering engine 650 when the corresponding pixel in the live footage is a specific color of green, otherwise output a pixel value from the corresponding pixel in the live footage."

Merging system 660 might include computer processing capabilities, image processing capabilities, one or more processors, program code storage for storing program instructions executable by the one or more processors, as well as user input devices and user output devices, not all of which are shown. Merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of merging system 660, such as modifying boundaries of segmented objects, inserting blurs to smooth out imperfections, or adding other effects. Based on its inputs, merging system 660 can output an image to be stored in a static image storage 670 and/or a sequence of images in the form of video to be stored in an animated/combined video storage 672.

Thus, as described, visual content generation system 600 can be used to generate video that combines live action with computer-generated animation using various components and tools, some of which are described in more detail herein. While visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
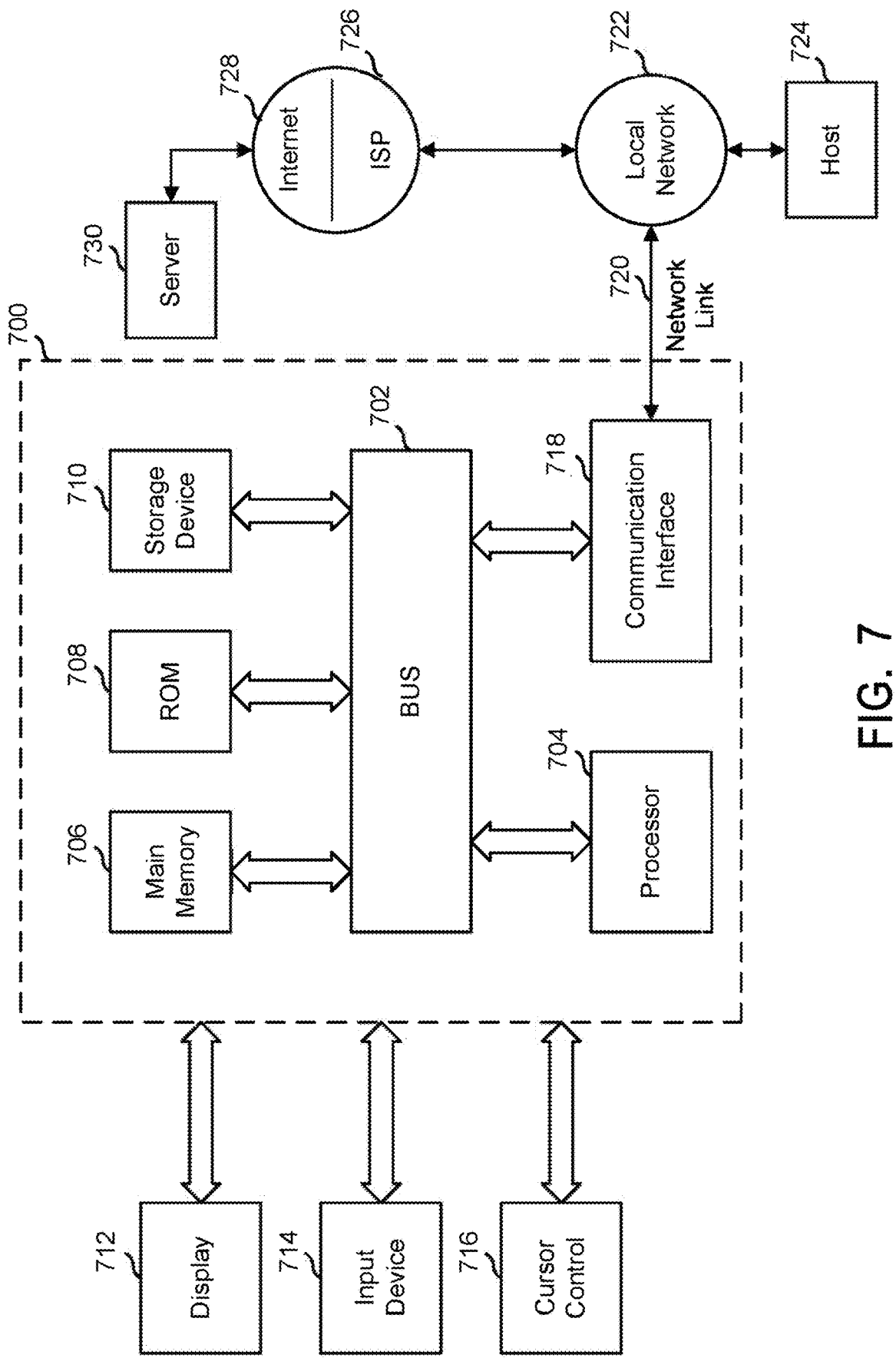
FIG. 7 illustrates an example visual content generation system as might be used to generate imagery in the form of still images and/or video sequences of images in accordance with an embodiment.

For example, FIG. 7 is a block diagram that illustrates a computer system 700 upon which the computer systems of the systems described herein and/or visual content generation system 600 (see FIG. 6) may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire, and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for, in a computer graphics generation system, wherein at least some virtual fibers of a set of virtual fibers are organized into one or more fiber clumps, computing a representation of a virtual surface for a fiber clump of the one or more fiber clumps, the method comprising:

receiving a first vertex set for the virtual fibers of the fiber clump, wherein at least some of the virtual fibers include a fiber curve, the fiber curve including one or more vertex of the first vertex set;

obtaining an artist parameter associated with a table of precomputed values that represents a desired artist effect for the virtual fibers, wherein the table of precomputed values is associated with evaluations of a convolution integral for a convolved kernel that are performed prior to computing the representation of the virtual surface for the fiber clump, and wherein the table of precomputed values is further associated with an inverse of a square of the artist parameter;

determining one or more associations between the vertices in the first vertex set based on the artist parameter;

computing a second vertex set for the fiber clump from the one or more associations; and generating the virtual surface for the fiber clump from at least the second vertex set.

2. The computer-implemented method of claim 1, wherein the method further comprises:

determining a plurality of orthogonal gradients using one or more vertex of the second vertex set, wherein the virtual surface is further generated using the plurality of orthogonal gradients.

3. The computer-implemented method of claim 2, wherein determining the plurality of orthogonal gradients comprises computing a finite-support kernel, wherein the artist parameter further comprises a smoothing radius of a density field of the finite-support kernel, and wherein the smoothing radius may be adjusted to control the virtual surface.

4. The computer-implemented method of claim 1, wherein the table of precomputed values for the artist parameter is further associated with an inverse of (2k+1) of a polynomial associated with one or more of the first vertex set.

5. The computer-implemented method of claim 1, wherein the table of precomputed values for the artist parameter is further associated with a binomial coefficient of n and k, for some integers k and n with 0≤k.

6. The computer-implemented method of claim 1, wherein the method further comprises:

animating the virtual surface for the fiber clump from at least the second vertex set in one or more video frames.

7. The computer-implemented method of claim 1, wherein the method further comprises:

evaluating a density gradient at each of the vertices in the second vertex set; and generating a shading of the virtual surface based at least one the density gradient, wherein the virtual surface is further generated using at least one of the density gradient or the shading.

8. The computer-implemented method of claim 1, wherein the evaluations of the convolution integral for the convolved kernel are based on a local frame for a point defined by two vectors generated from two or more vertices of the first vertex set.

9. A computer system for computing, in a computer graphics generation system, a representation of a virtual surface for a fiber clump in a set of virtual fibers, the computer system comprising:

one or more processors; and a storage medium storing instructions, which when executed by the one or more processors, cause the computer system to perform operations comprising:

receiving a first vertex set for the virtual fibers of the fiber clump, wherein at least some of the virtual fibers include a fiber curve, the fiber curve including one or more vertex of the first vertex set;

obtaining an artist parameter associated with a table of precomputed values that represents a desired artist effect for the virtual fibers, wherein the table of precomputed values is associated with evaluations of a convolution integral for a convolved kernel that are performed prior to computing the representation of the virtual surface for the fiber clump, and wherein the table of precomputed values is further associated with an inverse of (2k+1) of a polynomial associated with one or more of the first vertex set;

determining one or more associations between the vertices in the first vertex set based on the artist parameter;

computing a second vertex set for the fiber clump from the one or more associations; and generating the virtual surface for the fiber clump from at least the second vertex set.

10. The computer system of claim 9, wherein the operations further comprise:

determining a plurality of orthogonal gradients using one or more vertex of the second vertex set, wherein the virtual surface is further generated using the plurality of orthogonal gradients.

11. The computer system of claim 10, wherein determining the plurality of orthogonal gradients comprises computing a finite-support kernel, wherein the artist parameter further comprises a smoothing radius of a density field of the finite-support kernel, and wherein the smoothing radius may be adjusted to control the virtual surface.

12. The computer system of claim 9, wherein the table of precomputed values for the artist parameter is further associated with an inverse of a square of the artist parameter.

13. The computer system of claim 9, wherein the table of precomputed values for the artist parameter is further associated with a binomial coefficient of n and k, for some integers k and n with 0≤k.

14. The computer system of claim 9, wherein the operations further comprise:

animating the virtual surface for the fiber clump from at least the second vertex set in one or more video frames.

15. The computer system of claim 9, wherein the operations further comprise:

evaluating a density gradient at each of the vertices in the second vertex set; and generating a shading of the virtual surface based at least one the density gradient, wherein the virtual surface is further generated using at least one of the density gradient or the shading.

16. A system comprising: at least one processor, and a non-transitory storage medium storing instructions, which when executed by the at least one processor, cause the system to implement the computer-implemented method of claim 1.

17. A non-transitory computer-readable storage medium storing instructions, which when executed by at least one processor of a computer system, causes the computer system to carry out the computer-implemented method of claim 1.

18. A non-transitory computer-readable medium carrying instructions, which when executed by at least one processor of a computer system, causes the computer system to carry out the computer-implemented method of claim 1.

\* \* \* \* \*